United States Patent [19]

Furness, Jr. et al.

[11] Patent Number: 5,417,852
[45] Date of Patent: May 23, 1995

[54] APPARATUS FOR REMOVING CONTAMINANTS FROM WASTE FLUIDS

[75] Inventors: James C. Furness, Jr., Versailles, Ky.; John W. Barnstead, Oakland City; Kenneth J. Rasche, Evansville, both of Ind.

[73] Assignee: Sun River Innovations, Ltd., Lexington, Ky.

[21] Appl. No.: 4,951

[22] Filed: Jan. 15, 1993

[51] Int. Cl.⁶ .............................................. C02F 9/00
[52] U.S. Cl. .................................. 210/188; 210/192; 210/202; 210/259; 210/266
[58] Field of Search ............ 210/748, 760, 202, 221.2, 210/259, 266, 188, 192; 250/504 R

[56] References Cited

U.S. PATENT DOCUMENTS 4,798,960  1/1989  Keller et al. ................... 250/504 R
5,180,499  1/1993  Hinson et al. .................... 210/748

Primary Examiner—Ivars Cintins
Attorney, Agent, or Firm—Bell, Seltzer, Park & Gibson

[57] ABSTRACT

The present invention provides a method for removing contaminants from a waste fluid stream. The method includes contacting a waste fluid stream with a promoter of hydroxyl radicals to entrain the promoter of hydroxyl radicals in the waste fluid stream, passing the waste fluid stream having the promoter of hydroxyl radicals entrained therewithin along a substantially tortuous path to allow the promoter of hydroxyl radicals to dwell within the waste fluid stream and to further entrain the promoter of hydroxyl radicals in the waste fluid stream, and irradiating the waste fluid stream with ultraviolet radiation. The present invention also provides an apparatus for removing contaminants from a waste fluid stream.

5 Claims, 4 Drawing Sheets

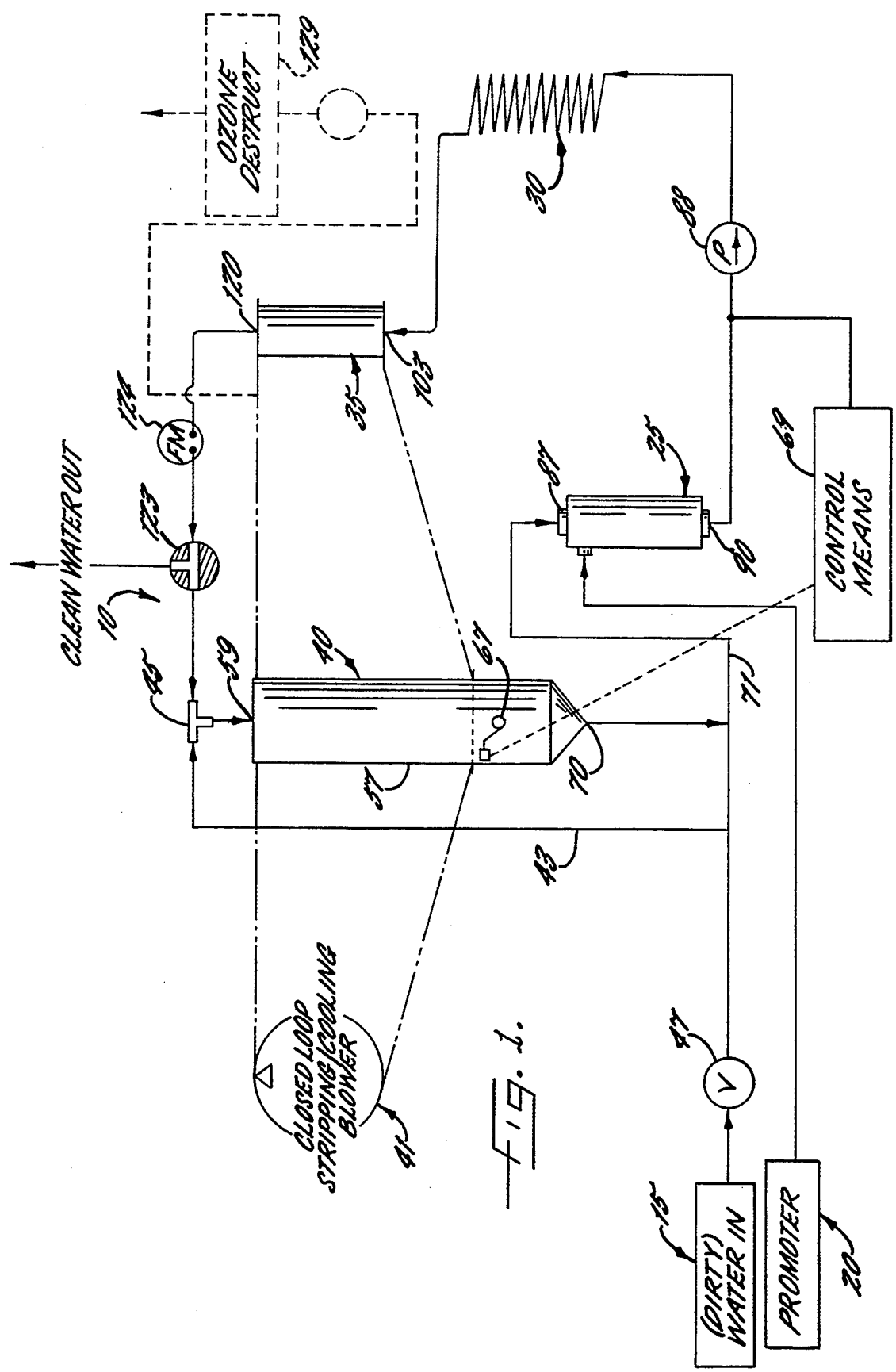

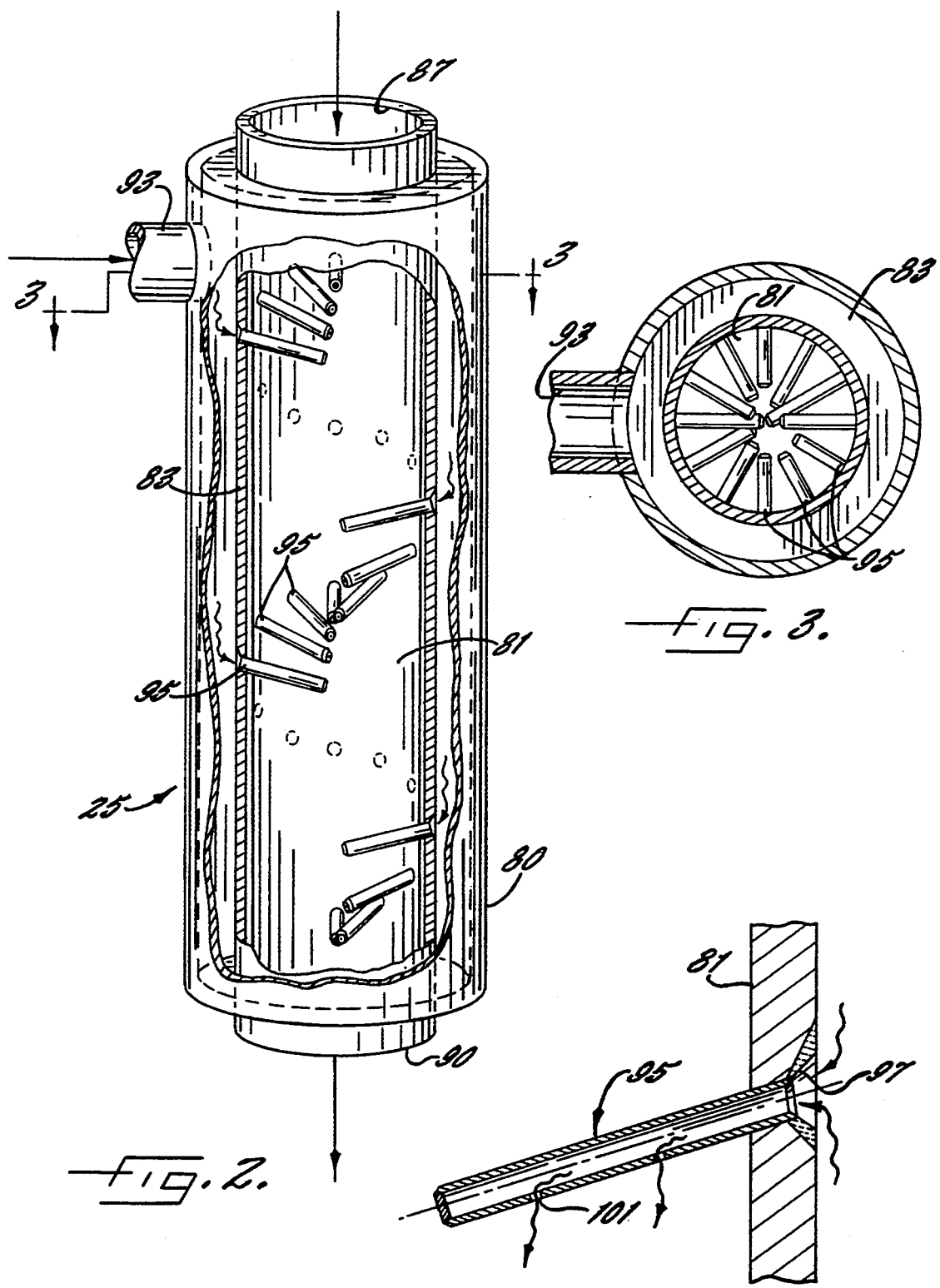

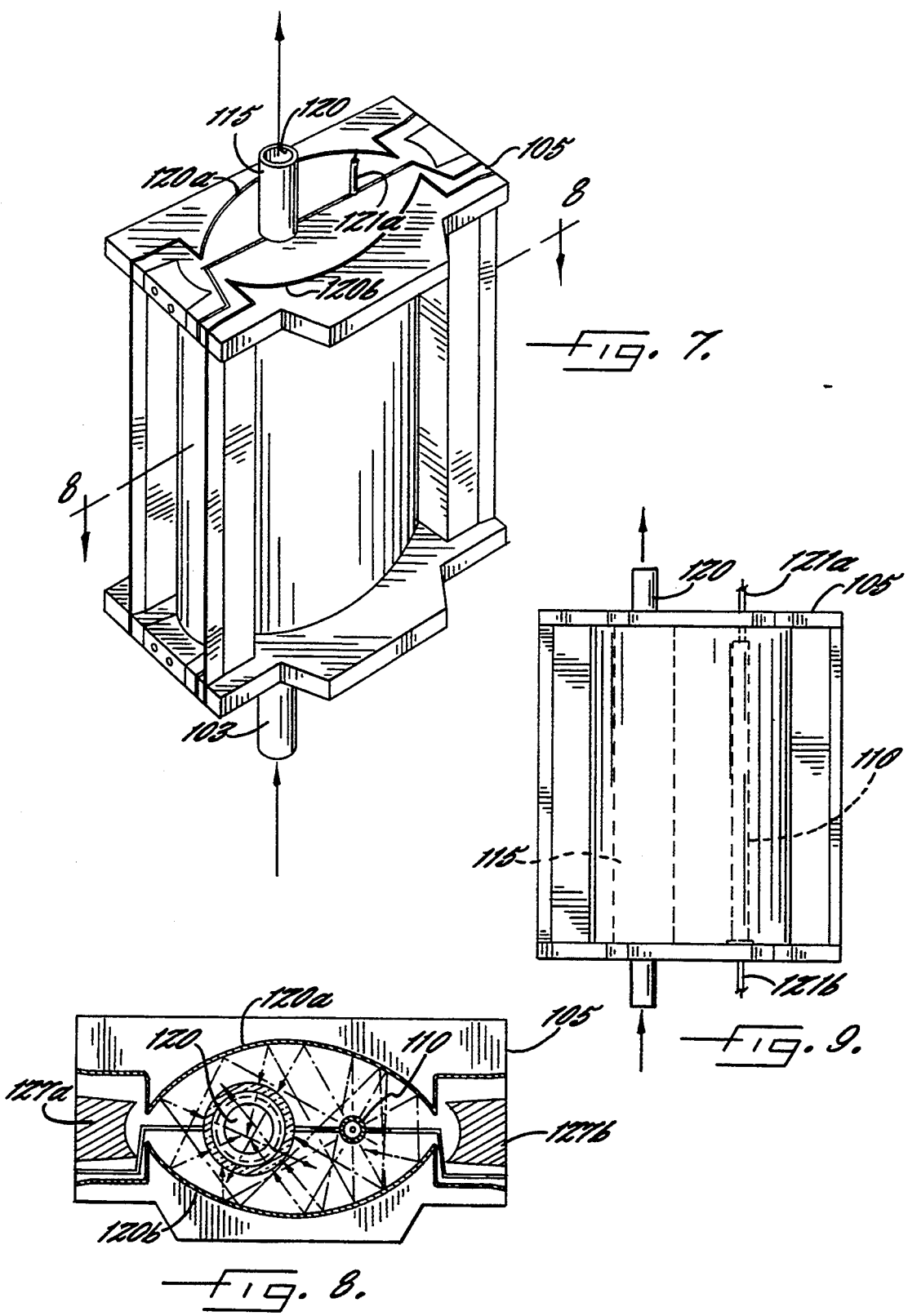

APPARATUS FOR REMOVING CONTAMINANTS FROM WASTE FLUIDS

FIELD AND BACKGROUND OF THE INVENTION

This invention relates to removing contaminants from a waste fluid, and more particularly to an apparatus and method utilizing a source of hydroxyl radicals and ultraviolet (UV) radiation to remove contaminants.

Purifying apparatus and methods for removing organic and inorganic contaminants and microorganisms from various fluids such as water are known. Exemplary methods include incineration, chemical detoxification, ozonation and exposure to ultraviolet (UV) radiation. These methods, however, generally have not attained wide acceptance either on a large or small scale because of expense, size of the equipment needed, formation of undesirable by-products (e.g., toxic off-gases), and other similar problems.

An alternative is to utilize ozonation in combination with exposure to radiation such as UV radiation. The UV radiation is used to kill microorganisms and viruses, and is used as a catalyst for the ozonation reaction. This reaction is generally:

$$O_3 + H_2O + h\nu \rightarrow H_2O_2 \qquad (1)$$

$$H_2O_2 + h\nu \rightarrow 2OH \qquad (2)$$

$$H_2O_2 \rightleftharpoons HO_2^- + H^+ \qquad (3)$$

$$HO_2^- + O_3 \rightarrow O_3^{-\cdot} + HO_2\cdot \qquad (4)$$

$$HO_2\cdot \rightleftharpoons H^+ + O_2^{-\cdot} \qquad (5)$$

$$O_3 + O_2^{-\cdot} \rightarrow O_2 + O_3^{-\cdot} \qquad (6)$$

$$O_3^{-\cdot} + H^+ \rightarrow OH\cdot + O_2 \qquad (7)$$

Reactions (3)–(7) demonstrate how ozone can be utilized to generate hydroxyl radicals. The hydroxyl radicals (HO—) are then used to react with contaminants, e.g., organic contaminants, as follows:

$$HO\cdot + \text{organic contaminants} \rightarrow CO_2 + H_2O + O_2 \qquad (8)$$

The use of ozonation (or other methods using hydroxyl radicals) and UV radiation, however, has been limited from a commercial standpoint for use in comparatively small units or installations away from domestic water supplies. Thus there has been considerable interest in improving ozonation and UV treatment techniques.

For example, U.S. Pat. No. 4,230,571 to Dadd proposes a method wherein UV radiation generates ozone from air, the ozone is mixed with the water to be purified and the water/ozone mixture is subjected to UV radiation. The water/ozone mixture is directed through a helical path around the UV radiation source to extend the duration of exposure. U.S. Pat. Nos. 4,273,660 and 4,274,970 to Beitzel propose methods using a UV lamp positioned around a transparent tube for carrying the water. Water within the transparent tube is moved turbulently. U.S. Pat. No. 4,752,401 to Bodenstein proposes a method and apparatus for treating water wherein the water flows in direct contact with an ozone-producing UV lamp.

There has also been interest in improving the various components needed for the ozonation and UV treatment techniques, namely the means for ozonating the water, the UV lamp itself, the chamber wherein the UV and the water are reacted, and the like. For example, U.S. Pat. No. 5,120,450 to Stanley, Jr. proposes a reaction vessel wherein an interior surface thereof comprises a plurality of ridges covered by a non-stick material. The ridges are said to stabilize placement of the non-stick material. U.S. Pat. No. 4,948,980 to Wedekamp proposes a tubular UV radiation device having at least two UV light sources with oblong flat in cross-section reflectors external to the tubular body. See also, for example, U.S. Pat. Nos. 3,634,025 and 3,700,406 to Landry and 4,101,777 to Reid.

It would be highly desirable to provide a method and apparatus for removing contaminants from a waste fluid stream efficiently and effectively, and that can be used on a large or small scale.

SUMMARY OF THE INVENTION

The present invention provides a method for removing contaminants from a waste fluid stream. The method includes contacting a waste fluid stream with a promoter of hydroxyl radicals to entrain the promoter of hydroxyl radicals (e.g., ozone) in the waste fluid stream, passing the waste fluid stream having the promoter of hydroxyl radicals entrained therewithin along a substantially tortuous path to allow the hydroxy radicals to dwell within the waste fluid stream and to further entrain the promoter of hydroxyl radicals in the waste fluid stream, and irradiating the waste fluid stream with ultraviolet radiation.

The present invention also provides an apparatus for removing contaminants from a waste fluid stream. The apparatus comprises means for supplying a waste fluid stream, means for providing a promoter of hydroxyl radicals, mixing means operatively associated with the means for supplying a waste fluid stream and the means for providing a source of hydroxyl radicals within the waste fluid stream for entraining the promoter of hydroxyl radicals in the waste fluid stream, dwell manifold means for passing the waste fluid stream having the promoter of hydroxyl radicals entrained therewithin along a substantially tortuous path to allow the promoter of hydroxyl radicals to dwell within the waste fluid stream and to further entrain the promoter of hydroxyl radicals in the waste fluid stream, and irradiation means for irradiating the waste fluid stream with ultraviolet radiation.

BRIEF DESCRIPTION OF THE DRAWINGS

FIG. 1 is a schematic and diagrammatic representation of an apparatus in accordance with the present invention.

FIG. 2 is a perspective view of a mixing means in accordance with an embodiment of the present invention.

FIG. 3 is a cross-sectional view of the mixing means taken along line 3—3 of FIG. 2.

FIG. 4 is an enlarged cross-sectional view of an injector nozzle of the mixing means shown in FIGS. 2 and 3.

FIG. 7 is a perspective view of irradiation means in accordance with an embodiment of the present invention.

FIG. 8 is a cross-sectional view of the irradiation means taken along line 8—8 of FIG. 7.

FIG. 9 is a cross-sectional view of the irradiation means taken along line 9—9 of FIG. 7.

DETAILED DESCRIPTION OF THE INVENTION

Figure 5:
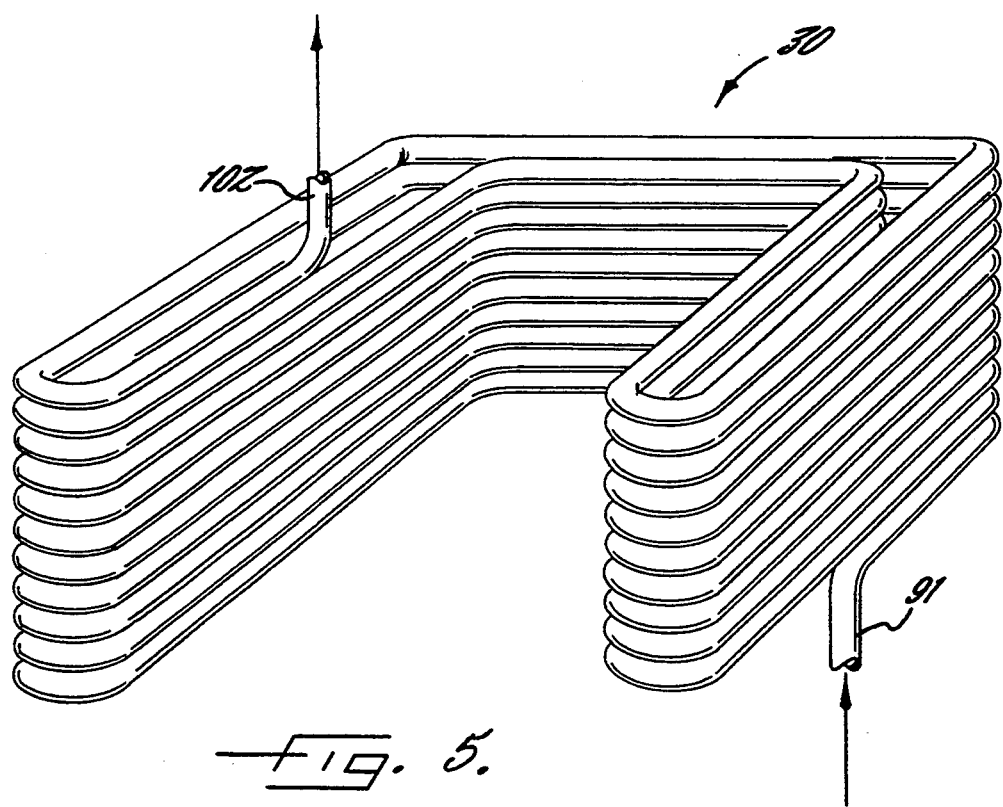
FIG. 5 is a perspective view of a dwell manifold means in accordance with an embodiment of the present invention.

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Referring to FIG. 1, the apparatus for removing contaminants from a waste fluid stream is designated by the reference number 10. The apparatus 10 comprises a waste fluid supply means 15, an ozone generating means 20 or other means for providing a source of hydroxyl radicals, mixing means 25, dwell manifold means 30 and irradiation means 35. The apparatus can also include a stripper means 40. Operatively associated with the irradiation means 35 and the stripper means 40 is a blower 41. The blower 41 circulates a gas (e.g., air) to cool the irradiation means 35 and facilitates the stripping of contaminants by the stripping means 40 through an air phase destruct mechanism.

The waste fluid supply means 15 supplies water or other fluid from a source wherein the fluid has become contaminated with organic and inorganic contaminants, microorganisms, viruses and the like. For example, water used in a manufacturing process often cannot be passed directly into the sewer system and must be decontaminated prior to doing so. Alternatively, the water could be tap water or deionized water which is to be ultrapurified. Ultrapure water which is used, for example, in fabricating semiconductor devices, is water having ppm to ppb levels of contaminants removed therefrom. Alternatively, the fluid could be air in which case a source of water would be included to facilitate decontaminating the air.

The waste fluid supply means 15 is operatively connected to the stripper means 40 via a conduit 43 and a T-fitting 45. It is noted that the rate of flow of the waste fluid stream can be controlled using a pump as will be known to those skilled in the art, although the pressure in a conventional water supply will often be sufficient. The stripper means 40 includes a housing 57, stripper media and filter media (not shown) positioned within the housing 57, and an inlet 59 for permitting passage of air or other gas from a blower 41 into the housing 57. The stripper media permits a larger surface area of the waste fluid stream to be exposed to the air from the blower 41. This exposure enhances the transfer rate and efficiency of the stripping of the volatile contaminants from the waste fluid stream, and contributes to the air phase destruct of contaminants. An exemplary stripper media is described in U.S. Pat. No. 4,668,442 to Lang the disclosure of which is incorporated herein by reference, and is sold under the trade name Lanpac ® by Lantec Products, Inc., Agoura Hills, Calif. The blower 41 is typically run at a rate of from about 100 to 800 cfm, and preferably about 300 to 400 cfm.

The filter media is used to remove various contaminants typically organic in nature from the waste fluid stream. An exemplary filter media is an activated carbonaceous bed, although the use of other filter media such as zeolite beds, activated mineral beds, (e.g., alumina), etc., will be well within the skill of one in the art. Optionally, a perforated plate (not shown) or the like can be positioned horizontally in the housing 57 to further facilitate passing the air or other gas through the waste fluid stream. Additionally, the level of the waste fluid stream can be controlled by a float valve 67 operatively associated with and controlled by a computer 69 or other control means. A low float safety switch (not shown) can also be included to indicate when there is a undesirable lower water level in the stripping means 40. Alternatively, a sensor or probe (not shown) can be used to determine changes in the pH, conductivity or the like of the fluid stream in the stripper means 40.

The waste fluid stream exits the stripper means 40 via stripper means outlet 70 and is carried via conduit 71 to the mixing means 25. The partially decontaminated waste fluid stream then passes into the mixing means 25 via inlet 77. The mixing means 25 is operatively associated with ozone generating means 20. The ozone generating means is typically a device which converts oxygen or air to ozone by an electrical discharge method. Exemplary ozone generating means include the GTC-2A and GTC-2B ozone generators available from Griffin Technics, Inc. of Lodi, N.J. and $O_3$-43 ozone generator available from $O_3$ Associates of Kensington, Calif. It is recognized that other promoters or sources of hydroxyl radicals such as hydrogen peroxide, titanium dioxide and Fenton's reagent can be used in gaseous, liquid or solid form.

The mixing means 25 can be a conventional mixer/injector such as described in U.S. Pat. No. 4,123,800 to Mazzei, the disclosure of which is incorporated herein by reference. Or, as shown in FIGS. 2 and 3, the mixing means 25 can comprise a housing 80 having an inner portion 81 and an outer portion 83 coaxial with each other and made of material which is non-corrosive and resistant to oxidation by ozone or other promoters of hydroxyl radicals. Exemplary materials include stainless steel, polyvinyl chloride, silicon bronze, Kynar ® and the like. The inner portion 81 is a tube of predetermined length having an upper fluid inlet 87 for receiving the waste fluid stream and a lower outlet 90. The outer portion 83 is a tube having a diameter larger than that of the inner portion 81. The outer portion 83 has an upper inlet 93 for receiving the promoter of hydroxyl radicals. A plurality of injection nozzles 95 connect the outer portion 83 with the inner portion 81 and allows passage of the promoter of hydroxyl radicals from the outer portion 83 out into the inner portion 81 through ports 101 (See FIG. 4).

In this embodiment, a pump 88 downstream from the mixing means 25 is used, and thus the promoter of hydroxyl radicals is at a higher pressure as compared to the waste fluid stream thereby facilitating movement of the promoter into the waste fluid stream. The injection nozzles 95 are tubular and are angled in the same direction as the flow of the waste fluid stream. Additionally, the injection nozzles 95 are positioned helically or randomly around the inner portion 81 of the mixing means 25, for example, at 0, 135, 225, 90, 315, 270, 45 and 180 degrees relative to the flow of the waste fluid stream. As shown in FIG. 4, the injector nozzles 95 can include a v-shaped or cambered inlet 97 or outlet to prevent fouling due to build-up of solid material thereon. The longitudinal spacing of the injector nozzles 95 also varies. The angle of the injection nozzles, the position of the nozzles and the spacing between the nozzles creates turbulence (i.e., vortices) in the inner portion 81, over the injector nozzles 95 and on the backside of the injector nozzles 95, and entrains the promoter of hydroxyl radicals in the waste fluid stream. Although the Applicants do not wish to be bound to any one theory, it is believed that the mixing enables the promoter of hydroxyl radicals to be uniformly mixed on a molecular level at a higher density with the waste fluid stream. This facilitates the reaction of the waste fluid stream and the hydroxyl radicals.

Figure 6:
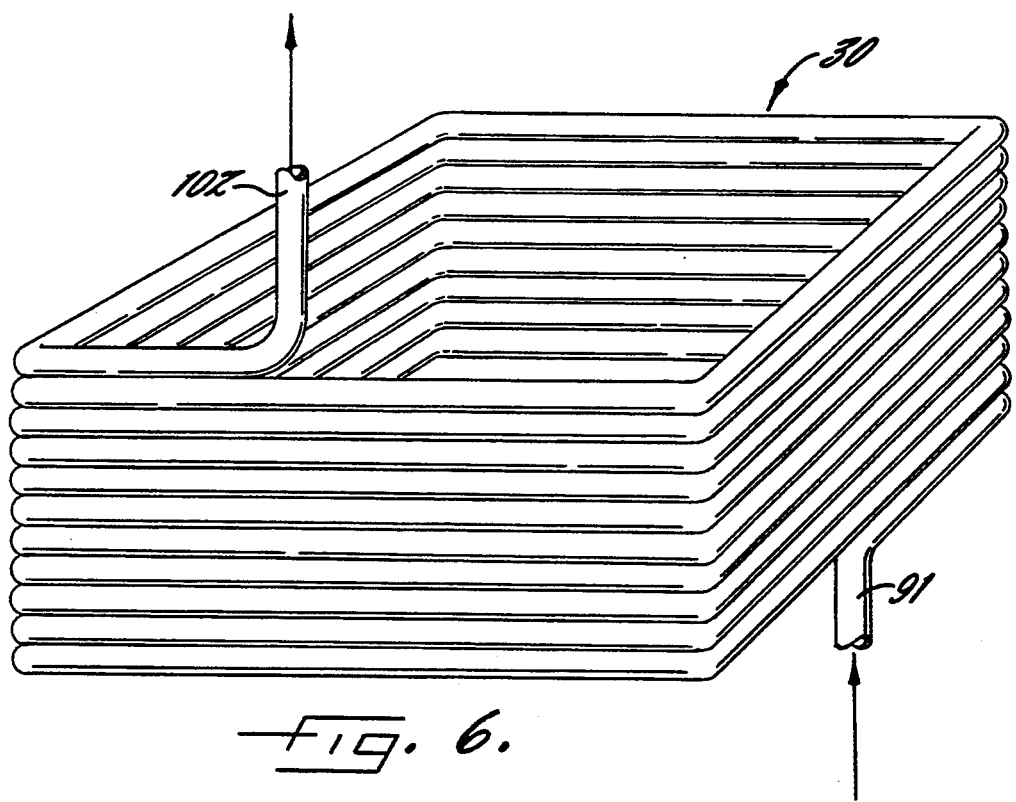
FIG. 6 is a perspective view of another dwell manifold means in accordance with another embodiment of the present invention.

The promoter/waste fluid stream mixture then exits the mixing means 25 via lower outlet 90. The promoter/waste fluid stream mixture is passed through the dwell manifold means 30 through inlet 91 at a rate of about for example, about 40 to 55 gpm. The dwell manifold means 30 is typically made of such as stainless steel, polyvinyl chloride, silicon bronze, Kynar® and the like which is non-corrosive and resistant to oxidation by ozone or other promoters of hydroxyl radicals, and is preferably 290 to 300 feet in length for a tube having a inner diameter of about 1.6 inches. Referring to FIGS. 5 and 6, the dwell manifold means 30 is a tube bent into a u-shape, a rectangular shape, or similar shape so that the waste fluid stream has to travel a substantially tortuous and time-consuming path of bends and straight portions to an outlet 102 to the irradiation means 35. Because of the substantially tortuous path turbulent flow is also occurring in the dwell manifold means along the walls thereof. Thus, it is believed that the promoter of hydroxyl radicals continues to be uniformly mixed on a molecular level with the waste fluid stream.

The promoter/waste fluid stream is carried to an irradiation means 35. The irradiation means can be a tubular, cylindrical lamp 110 of a type commonly employed for producing UV radiation or other similar radiation such as described in U.S. Pat. No. 4,273,660 to Beitzel, the disclosure of which is incorporated herein by reference. The promoter/waste fluid stream is passed around the lamp, or the irradiation lamp is directed toward a tube 115 or other means for supplying the waste fluid stream. Such a tube 115 must be transparent to the wavelength of the irradiation. The tube should be made from a material that is chemically inert (e.g., non-stick) and will not deteriorate on long exposure to radiation. Exemplary tube materials are fluorinated polyalkylene resins such as fluorinated ethylene propylene (Teflon®), quartz, and quartz coated with Teflon®.

In the embodiment shown in FIGS. 7-9, the irradiation means can comprise an inlet 103, a housing 105, a lamp 110, a tube 115 for supplying the promoter/fluid stream, and a pair of opposing elliptical reflection means 120a, 120b. The lamp is powered via conductors 121a, 121b which extend through the housing 105 for connection to a suitable source of electric current external to the housing LOS. The lamp 110 is positioned at one focus of the elliptical reflection means 120 and the center of tube 115 is positioned at an opposite focus of the elliptical reflection means 120. This recreates the mirror image of the arc of radiation in the waste fluid stream in the tube 115. Opposing end reflectors 127a, 127b can also be used to reflect additional irradiation towards the tube 115. Thus, the waste fluid stream is irradiated with a high concentration of UV radiation. The lamp 110 is cooled via passing gas (e.g., air) from the blower 41 over the lamp 110.

The waste fluid stream exits the irradiation means via outlet 120. If sufficient amounts of contaminants have been removed, the waste fluid stream is passed through three-way discharge valve 123 to the outside (i.e., into the sewer system). The flow can be controlled by flow meter 124. Any unwanted ozone or hydroxyl radicals can be destroyed by ozone destruct means 129 or other means for removing hydroxyl radicals.

Typically, however, the waste fluid stream is passed back through the apparatus 10 one or more times to further decontaminate the waste fluid stream. The Applicants theorize that once the contaminants are partially oxidized, they will react to a much greater extent and more efficiently during the one or more passes back through the apparatus partially on exposure to the stripper media in the stripper means 40. It is believed that by passing the partially decontaminated waste fluid stream back through the stripping means 40 that an air phrase destruct is occurring as the waste fluid stream is contacted with the cooling gas from the lamp 110 of the irradiation means 35. Namely, in the air phase contaminants are more readily broken down by the hydroxyl radicals to the more desired non-toxic components. Moreover by using the blower 41 to both cool the lamp 110 and to facilitate decontamination in a closed loop system, a more efficient and effective decontamination system is realized.

It is recognized that the various components of the apparatus (e.g., mixing means, irradiation means, pumps, valves and the like) can all be controlled by the control means 69.

In operation, the waste fluid stream is contacted with the promoter of hydroxyl radicals in the mixing means 25 to entrain the promoter of hydroxyl radicals in the waste fluid stream. Prior to contacting, a gas can be passed through the waste fluid stream and the waste fluid stream passed through stripper and filter media in the stripper means 40 to remove contaminants. Turbulent flow of the promoter of hydroxyl radicals through the waste fluid stream can be used to facilitate entrainment. The waste fluid stream with the promoter of hydroxyl radicals entrained therewithin is then passed along a substantially tortuous path to allow the promoter of hydroxyl radicals to dwell within the waste fluid stream in the dwell manifold means 30 and to further entrain the promoter of hydroxyl radicals in the waste fluid stream. The waste fluid stream is then irradiated with UV radiation by the irradiation means 35. The waste fluid stream can be used as, or inasmuch as the contaminants are in a better state for break down, the steps of passing through the stripper means, contacting, allowing to dwell and irradiating the waste fluid stream can be repeated one or more times. By repeating the steps, an air phase destruct will occur in the stripping means and breakdown of the contaminants will continue during the repetition of the steps.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for removing contaminants from a waste fluid stream comprising
   (a) means for supplying a waste fluid stream;
   (b) stripper means for removing contaminants operatively associated with the means for supplying a waste fluid stream, said stripper means comprising a housing, stripper media, and filter media;
   (c) means for providing a promoter of hydroxyl radicals;
   (d) mixing means operatively associated with the stripper means and the means for providing a promoter of hydroxyl radicals for entraining the promoter of hydroxyl radicals in the waste fluid stream;
   (e) dwell manifold means for passing the waste fluid stream along a substantially tortous path of travel to allow the promoter of hydroxyl radicals to dwell within the waste fluid stream and to further entrain the promoter of hydroxyl radicals in the waste fluid stream, said dwell manifold means comprising a tube bent to provide a path of bends and straight portions; and
   (f) irradiation means for irradiating the waste fluid stream with ultraviolet light.

2. The apparatus of claim 1 wherein the mixing means includes a plurality of randomly oriented injection nozzles, said injection nozzles providing turbulence to entrain the promoter of hydroxyl radicals within the waste fluid stream.

3. The apparatus of claim 1 wherein the means for providing a promoter of hydroxyl radicals is an ozone generating means.

4. The apparatus of claim 1 wherein the irradiation means includes a UV lamp.

5. The apparatus of claim 1 wherein the irradiation means comprises a UV lamp, a waste water supply means transparent to UV light and at least one elliptical reflection means, wherein the UV lamp is positioned at one focus of the elliptical reflection means and the waste water supply means is positioned at an opposite focus of the elliptical reflection means.

* * * * *